(12) United States Patent
Zhang (10) Patent No.: US 10,061,771 B1
(45) Date of Patent: Aug. 28, 2018

(54) DOUBLE-SIDED DISPLAY SIMULTANEOUS TRANSLATION DEVICE, METHOD AND APPARATUS AND ELECTRONIC DEVICE

(71) Applicant: Shenzhen double monkey Technology Co., Ltd, Shenzhen (CN)

(72) Inventor: Yunjun Zhang, Shenzhen (CN)

( * ) Notice: Subject to any disclaimer, the term of this patent is extended or adjusted under 35 U.S.C. 154(b) by 0 days.

(21) Appl. No.: 15/623,367

(22) Filed: Jun. 14, 2017

(30) Foreign Application Priority Data

May 18, 2017 (CN) .......................... 2017 1 0351884

(51) Int. Cl.
    *G06F 17/28* (2006.01)
    *G10L 15/00* (2013.01)
    *G10L 15/30* (2013.01)
    *G06F 1/16* (2006.01)

(52) U.S. Cl.
    CPC .......... *G06F 17/289* (2013.01); *G06F 1/1692* (2013.01); *G06F 17/2872* (2013.01); *G10L 15/005* (2013.01); *G10L 15/30* (2013.01)

(58) Field of Classification Search
    CPC .. G06F 17/28; G06F 17/2836; G06F 17/2863; G06F 17/2872; G06F 17/2881; G06F 17/289; G06F 17/27; G06F 17/275
    USPC ...................... 704/2, 3, 4, 8, 9, 10, 231, 277
    See application file for complete search history.

(56) References Cited

U.S. PATENT DOCUMENTS

| | | | | |
|---|---|---|---|---|
| 5,854,997 A | * | 12/1998 | Sukeda | G06F 17/2827 704/3 |
| 9,886,228 B2 | * | 2/2018 | Kim | G06F 3/1438 |
| 2002/0173965 A1 | * | 11/2002 | Curry | G06F 17/289 704/275 |
| 2012/0310622 A1 | * | 12/2012 | Zivkovic | G06F 17/289 704/3 |

\* cited by examiner

*Primary Examiner* — Qi Han
(74) *Attorney, Agent, or Firm* — Wayne & Ken, LLC; Tony Hom (57) ABSTRACT

A double-sided display simultaneous translation method includes: receiving a voice input; translating the inputted voice according to a preset rule; and outputting translated contents. Different from the prior art, in the double-sided display simultaneous translation method provided in embodiments of the present invention, by means of a bidirectional voice input mode corresponding to a double-channel system, the same device allows both parties in communication to speak at the same time and can accurately differentiate voice of both parties to provide right translation.

2 Claims, 8 Drawing Sheets

DOUBLE-SIDED DISPLAY SIMULTANEOUS TRANSLATION DEVICE, METHOD AND APPARATUS AND ELECTRONIC DEVICE

FIELD OF THE INVENTION

Embodiments of the present invention relate to the technical field of information, and particularly relate to a double-sided display simultaneous translation device, method and apparatus and an electronic device.

BACKGROUND OF THE INVENTION

Simultaneous translation and especially face-to-face cross-language communication include two common modes, i.e., human translation and machine translation, on the market at present. In human translation, translators proficient in foreign languages act as a third party to translate words spoken by party A and party B in different languages. Human translation has the disadvantages that: cost is high; all-weather services cannot be provided; human translation is greatly influenced by factors such as individual levels, states, etc.; party A and party B cannot determine whether the translators as the third party accurately understand own words and accurately translate to the other party; and it is difficult to distinguish phenomena of word missing and sentence missing if party A and party B do not understand languages of other parties.

Machine translation mainly refers to that both parties in communication can see whether own language expressions are accurately inputted into a system through voice recognition and translation algorithm in a form of a mobile phone APP. As long as voice recognition is accurate, a translation result depends on the advanced degree of the translation algorithm. A biggest problem of the mobile phone APP in face-to-face simultaneous translation is that if both parties only use one device to translate, both parties need to continuously switch and only one person can speak; when two persons simultaneously speak, voice collection of the system may coincide and accurate translation is impossible; and if two devices are paired and used, then both parties need to download the same APP and to be skilled in operation. For foreigners visiting a country or for natives visiting foreign countries, this mode is very inconvenient because ecology of frequently-used software is different in regions and countries. Due to no acquaintance with foreign software which needs to be downloaded and used, people are limited by languages, network environments, proficiency degree of mobile phone operation and other aspects.

SUMMARY OF THE INVENTION

A main technical problem to be solved by embodiments of the present invention is to provide a double-sided display simultaneous translation device, method and apparatus and an electronic device, to realize timely translation, convenient usage and high accuracy rate.

To solve the above technical problem, a technical solution adopted by the present invention is: to provide a double-sided display simultaneous translation method, comprising:

receiving a voice input;

performing voice input through a microphone and converting a received voice analog signal into a digital signal;

wherein a step of receiving the voice input comprises: unidirectional input and bidirectional input;

translating the inputted voice according to a preset rule;

before a step of translating the inputted voice according to a preset rule, the method also comprises: judging a language to which the inputted voice belongs, wherein a step of judging a language to which the inputted voice belongs comprises local judgment or cloud judgment; local judgment means that: analyzing related features of the locally inputted voice and judging the language to which the related features belong; cloud judgment means that: uploading the inputted voice to a cloud server, analyzing related features of the inputted voice and judging the language to which the related features belong;

identifying the language of the inputted voice through a preset language if the language of the inputted voice is not judged;

a step of translating the inputted voice according to a preset rule comprises: translating the inputted voice into a corresponding language according to the preset rule;

outputting the translated contents;

output comprises: performing image output or performing voice output through a loudspeaker respectively in two display screens on a same apparatus, wherein performing image output means displaying translated contents alternately or simultaneously in the display screens and performing voice output means outputting the translated contents alternately or simultaneously through the loudspeaker.

Different from the prior art, in the double-sided display simultaneous translation method provided in embodiments of the present invention, by means of a bidirectional voice input mode corresponding to a double-channel system, the same device allows both parties in communication to speak at the same time and can accurately differentiate voice of both parties to provide right translation.

DETAILED DESCRIPTION OF THE INVENTION

For the convenience of understanding the present invention, the present invention is described in detail below in combination with drawings and specific embodiments. It should be noted that when an element is expressed as "fixed to" another element, the element can be directly arranged on another element or one or a plurality of centered elements may exist therebetween; and when an element is expressed as "connected with" another element, the element can be directly connected to another element or one or a plurality of centered elements may exist therebetween. Terms "vertical", "horizontal", "left", "right" and similar expressions used in the description are only for the purpose of illustration.

Unless otherwise defined, all technologies and scientific terms used in the description have the same meanings as generally understood by those skilled in the art of the present invention. The terms used in the description of the present invention are only for the purpose of describing specific embodiment in the description, not for limiting the present invention. The term "and/or" used in the description includes any one of and a combination of all of one or more related listed items.

Figure 1:
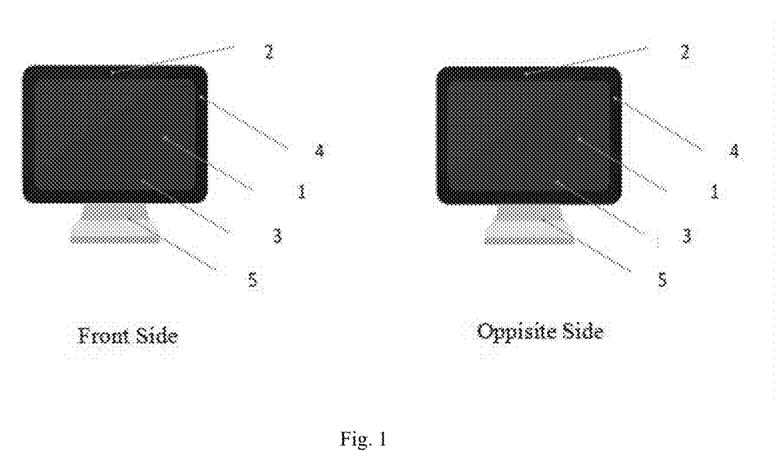
FIG. 1 is a structural diagram of a double-sided display simultaneous translation device provided in embodiments of the present invention.

Referring to FIG. 1, embodiments of the present invention provide a double-sided display simultaneous translation device, comprising: two display screens 1, two cameras 2, two microphones 3, a loudspeaker 4 and a base 5, wherein the two display screens 1 are touch control type display screens; the two display screens 1 are oppositely arranged on a housing (not shown in FIG. 1) respectively; one camera 2 is arranged on an upper side of each display screen 1; the two cameras 2 are also oppositely arranged structures; the two microphones 3 are oppositely arranged on a lower side of each display screen 1 respectively; an inner space can be formed between the two display screens 1 and the housing; the loudspeaker is arranged in the inner space; and the base 5 is arranged below the two display screens 1 for supporting the whole double-sided display simultaneous translation apparatus.

Figure 2:
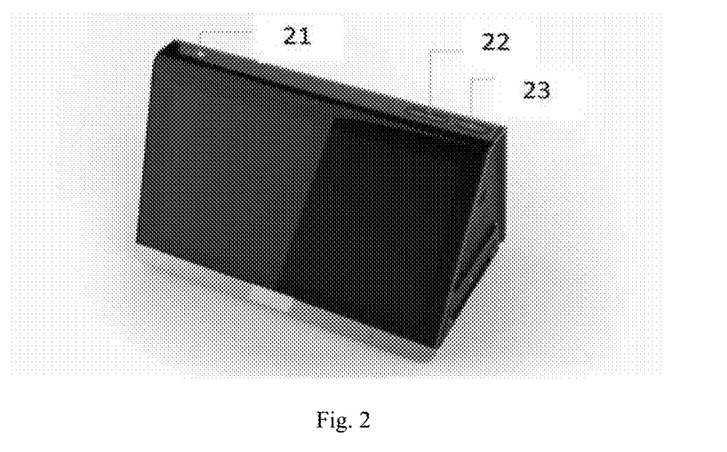
FIG. 2 is another structural diagram of a double-sided display simultaneous translation device provided in embodiments of the present invention.
Figure 3:
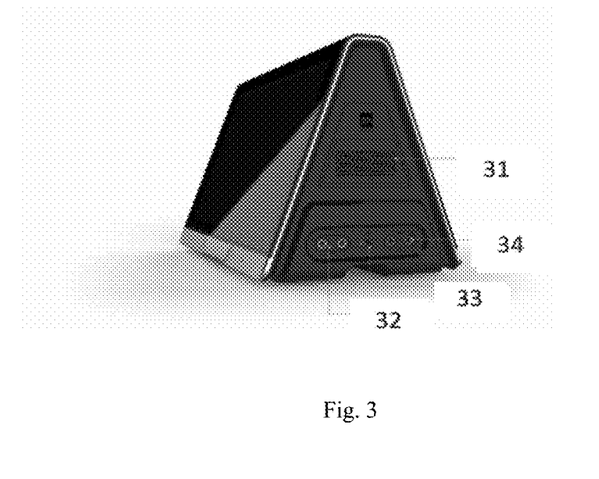
FIG. 3 is still another structural diagram of a double-sided display simultaneous translation device provided in embodiments of the present invention.

Referring to FIG. 2 and FIG. 3, the double-sided display simultaneous translation apparatus integrally presents a trapezoid shape; an indicator lamp 21, a volume button 22 and a power button 23 are arranged on a top surface of the apparatus; and the indicator lamp 21, the volume button 22 and the power button 23 are located on a same straight line.

A horn hole 31, an external acoustic interface 32, a USB interface 33 and an external microphone interface 34 are arranged on a side surface of the double-sided display simultaneous translation apparatus of the trapezoid shape.

Figure 4:
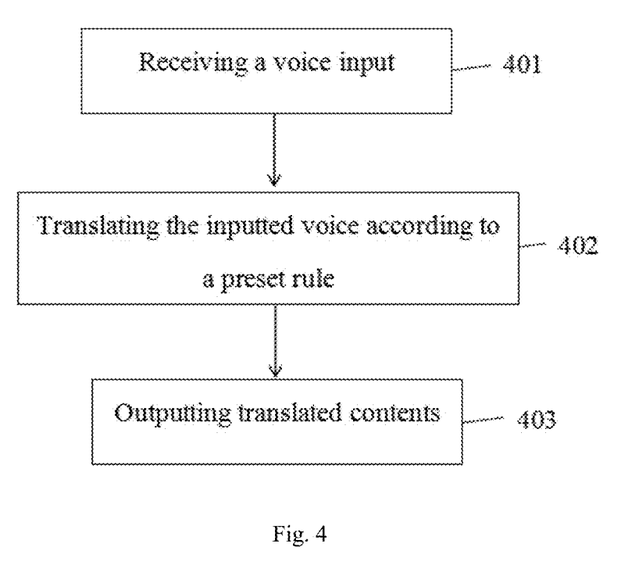
FIG. 4 is a flow chart of a double-sided display simultaneous translation method provided in embodiments of the present invention.

Referring to FIG. 4, based on the above double-sided display simultaneous translation device, embodiments of the present invention also provide a double-sided display simultaneous translation method, comprising:

Step 401: receiving a voice input through the microphone.

The voice input is performed through the microphone below the display screens, and a received voice analog signal is converted into a digital signal.

A step of receiving the voice input comprises: unidirectional input and bidirectional input, wherein unidirectional input means receiving unidirectional voice input through one microphone, and bidirectional voice input means receiving bidirectional voice input through two microphones.

After receiving the unidirectional voice input and the bidirectional voice input, a voice input signal is converted into a digital signal.

Step 402: translating the inputted voice according to a preset rule.

Before the step 402, the method can also comprise: judging a language to which the inputted voice belongs. A step of judging a language to which the inputted voice belongs comprises local judgment or cloud judgment. Local judgment means that: analyzing related features of the locally inputted voice and judging the language to which the related features belong; cloud judgment means that: uploading the inputted voice to a cloud server, analyzing related features of the inputted voice and judging the language to which the related features belong;

The language of the inputted voice can be identified through a preset language if the language of the inputted voice is not judged. For example, if a preset language is Chinese, the language of the received voice is identified as Chinese.

A step of translating the inputted voice according to a preset rule comprises: translating the inputted voice into a corresponding language according to the preset rule.

For example, if the inputted language is identified as Chinese and the preset rule is "translating into English", then the inputted Chinese is translated into English.

Step 403: outputting translated contents.

Output comprises: performing image output or performing voice output through a loudspeaker respectively in two display screens on a same apparatus, wherein performing image output means displaying translated contents alternately or simultaneously in the display screens and performing voice output means outputting the translated contents alternately or simultaneously through the loudspeaker.

Exemplarily, independent bidirectional voice input and output, and independent video output are performed. After processed by a system, voice inputted by a client A enters cloud recognition and translation; then the voice is displayed with the set language on a user B-oriented display screen; and translated voice is simultaneously outputted on the loudspeaker. The method can be used unidirectionally and can also be used bidirectionally; and both parties speak simultaneously, and the system synchronously translates, to respectively output the voice and the video.

Or, bidirectional synchronous machine translation is performed. After processed by the system, the voice inputted by the client A enters cloud recognition and translation; then the voice is displayed with the set language on a user B-oriented display screen; and translated voice is simultaneously outputted on the loudspeaker. The method can be used unidirectionally and can also be used bidirectionally; and both parties speak simultaneously, and the system synchronously translates, to respectively output the voice and the video.

Figure 5:
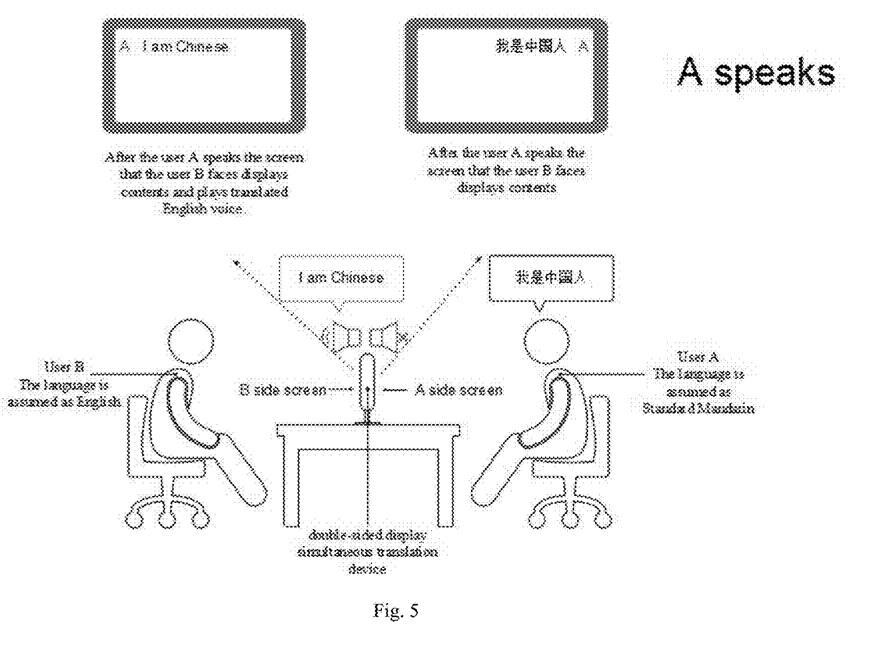
FIG. 5 is a diagram of an application example of a double-sided display simultaneous translation method provided in embodiments of the present invention.

Referring to FIG. 5, when the double-sided display simultaneous translation method is applied, a user A and a user B simultaneously face the double-sided display simultaneous translation apparatus; the user A faces a display screen A, and the user B faces a display screen B; when the language spoken by the user A is assumed as standard mandarin, the language spoken by the user B is English. When the user A speaks "I am Chinese", the microphone below the display screen A receives the voice input and can judge the language of the inputted voice "I am Chinese". When the language is judged to belong to Chinese and the preset translation rule is Chinese-English translation, then the voice "I am Chinese" can be translated into English "I am Chinese", displayed on the display screen B and outputted through the loudspeaker. At this moment, the sentence "I am Chinese" spoken by the user A is displayed on the screen A.

Figure 6:
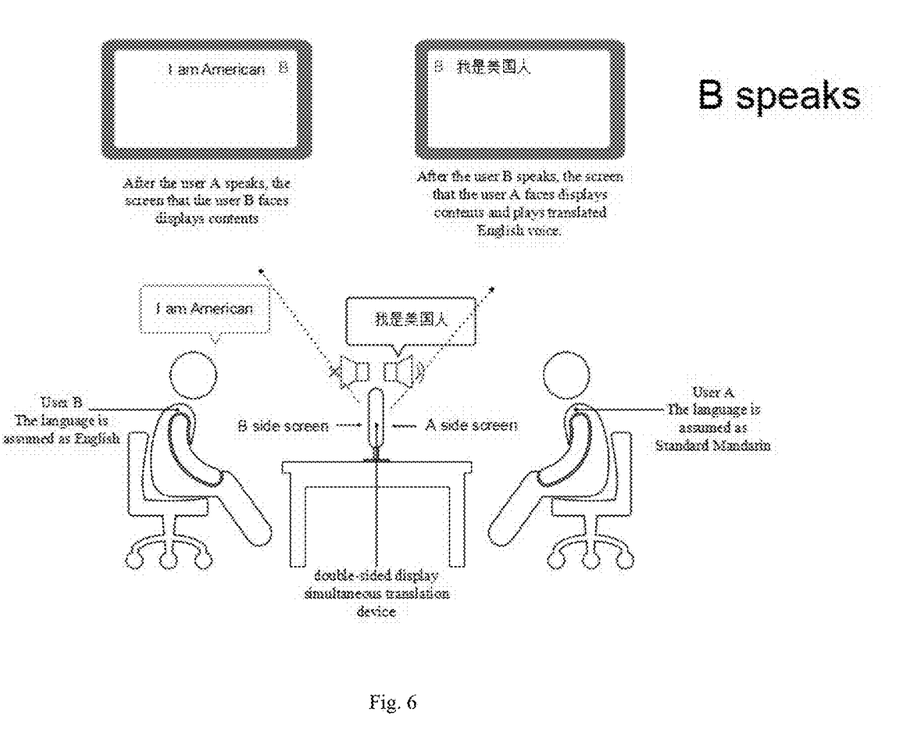
FIG. 6 is a diagram of another application example of a double-sided display simultaneous translation method provided in embodiments of the present invention.

Referring to FIG. 6, when the user B speaks "I am American", the microphone below the display screen B receives the voice input and can judge the language of the inputted voice "I am American". When the language is judged to belong to English and the preset translation rule is English-Chinese translation, then the voice "I am American" can be translated into Chinese "I am American", displayed under the sentence "I am Chinese" inputted previously in the display screen A, and outputted through the loudspeaker. At this moment, the sentence "I am American" spoken by the user B is displayed on the screen B under the sentence "I am Chinese" inputted previously.

Different from the prior art, in the double-sided display simultaneous translation device and method provided in embodiments of the present invention, by means of a bidirectional voice input mode corresponding to a double-channel system, the same device allows both parties in communication to speak at the same time and can accurately differentiate voice of both parties to provide right translation.

The double-channel system realizes differentiated video output, and can allow both parts using the device to see own interfaces and to display native languages and translation languages of other parties.

Figure 7:
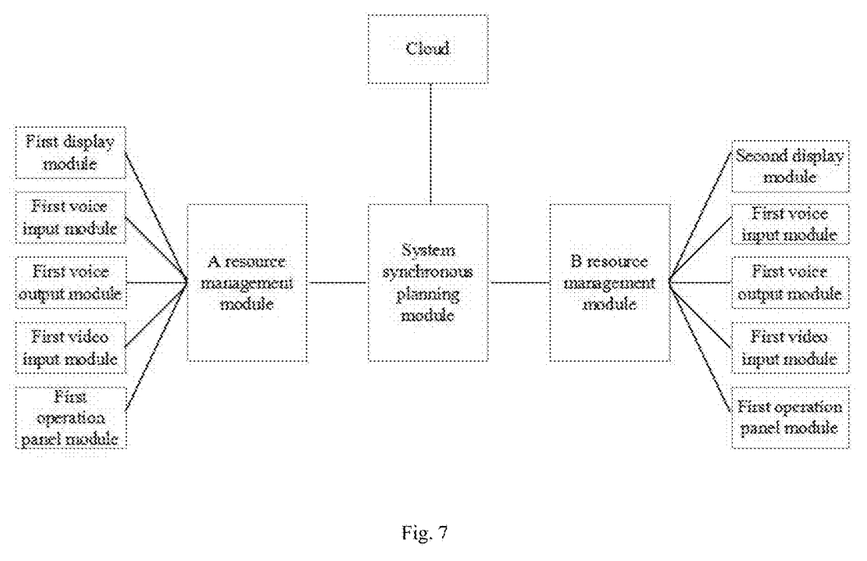
FIG. 7 is a structural block diagram of a double-sided display simultaneous translation apparatus provided in embodiments of the present invention.

Referring to FIG. 7, embodiments of the present invention provide a double-sided display simultaneous translation apparatus, comprising: a first display module, a first voice input module, a first voice output module, a first video input module, a first panel operation module, an A resource management module, a B resource management module, a system synchronous planning module, a second display module, a second voice input module, a second voice output module, a second video input module and a second panel operation module.

The first display module, the first voice input module, the first voice output module, the first video input module and the first panel operation module are respectively connected with the A resource management module.

The A resource management module controls the first display module, the first voice input module, the first voice output module, the first video input module and the first panel operation module to operate. The first display module is used for displaying translation contents. The first voice input module is used for performing voice input. The first voice output module is used for controlling the loudspeaker to output the voice. The first video input module is used for video input. The first panel operation module is used for receiving instruction input and executing corresponding instructions.

The second display module, the second voice input module, the second voice output module, the second video input module and the second panel operation module are respectively connected with the B resource management module.

The B resource management module controls the second display module, the second voice input module, the second voice output module, the second video input module and the second panel operation module to operate. The second display module is used for displaying translation contents. The second voice input module is used for performing voice input. The second voice output module is used for controlling the loudspeaker to output the voice. The second video input module is used for video input. The second panel operation module is used for receiving instruction input and executing corresponding instructions. The first panel operation module is used for receiving instruction input and executing corresponding instructions.

The A resource management module is connected with the B resource management module. Meanwhile, the A resource management module connected with the B resource management module is connected with the cloud.

Figure 8:
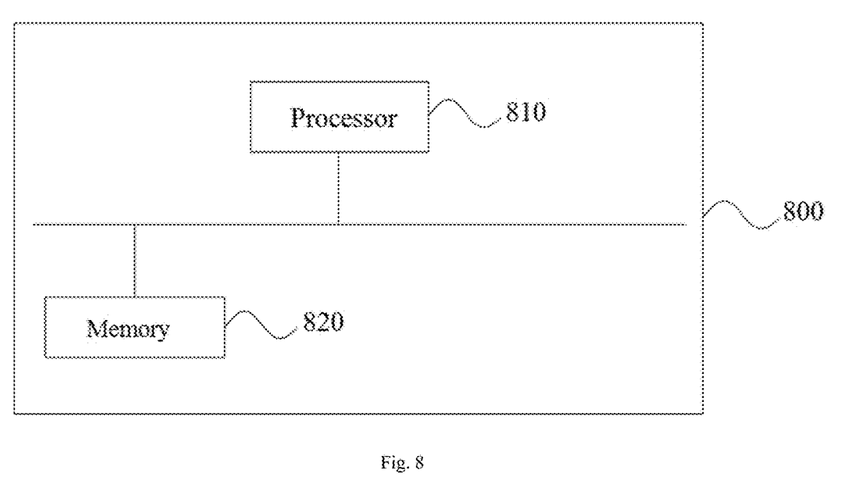
FIG. 8 is a structural diagram of an electronic device provided in embodiments of the present invention.

Referring to FIG. 8, FIG. 8 is a structural schematic diagram of hardware of an electronic device 800 of a double-sided display simultaneous translation method provided in embodiments of the present application. As shown in FIG. 8, the electronic device 800 comprises:

one or a plurality of processors 810 and a memory 820. One processor 810 is taken as an example in FIG. 8.

The processor 810 and the memory 820 can be connected through a bus or other modes. Connection through the bus is taken as an example in FIG. 8.

The memory 820 as a non-volatile computer readable storage medium can be used for storing non-volatile software programs, non-volatile computer executable programs and modules, such as corresponding program instructions/modules in the double-sided display simultaneous translation method in embodiments of the present application. The processor 810 executes various functional applications and data processing of a server by running the non-volatile software programs, the instructions and the modules stored in the memory 820, thereby realizing the double-sided display simultaneous translation method in the above method embodiment.

The memory 820 may include a program storage region and a data storage region, wherein the program storage region can store application programs required by an operating system and at least one function, and the data storage region can store data created in use, etc. In addition, the memory 820 may include a high-speed random access memory, and may also include a non-volatile memory, such as at least one disk storage device, flash memory device or other non-volatile solid-state storage devices. In some embodiments, the memory 820 optionally comprises memories arranged remotely relative to the processor 810. The remote memories can be connected to the translation apparatus through a network. The above network example includes but not limited to Internet, Intranet, LAN, a mobile communication network and a combination of above.

The one or the plurality of modules are stored in the memory 820, and when the modules are executed by the one or the plurality of processors 810, the double-sided display simultaneous translation method in any of the above method embodiments is executed.

The above product can execute the method provided in the embodiment of the present application, and has corresponding functional modules for executing the method and beneficial effects. Technical details not detailed in the present embodiment can be found in the method provided in the embodiment of the present application.

The embodiment of the present application provides a non-volatile computer readable storage medium, storing computer executable instructions which are executed by one or a plurality of processors. For example, one processor 810 in FIG. 8 can enable the one or the plurality of processors to execute the translation method in any of the above method embodiments.

The above described apparatus embodiment is only exemplary. Units described as separated components may be or may be not physically separated, and components displayed as the units may be or may not be physical units, and can be located in one place or distributed on a plurality of network units. Some or all the modules can be selected according to actual needs to realize the purpose of the solution in the present embodiment.

Through the above illustration of the embodiments, those ordinary skilled in the art can clearly know that various embodiments can be realized by means of software and a common hardware platform, and certainly can be realized through hardware. Those ordinary skilled in the art can understand that all or some flows in the above method embodiment can be completed through computer programs by instructing related hardware. The programs can be stored in the computer readable storage medium. When the programs are executed, the flows of the above method embodiments can be included. The storage medium may be a disk, an optical disc, a read-only memory (ROM) or a random access memory (RAM), etc.

It should be noted that the description and the drawings of the present invention provide preferred embodiments of the present invention. However, the present invention can be realized in many different forms, and not limited to the embodiments described in the description. The embodiments are not used as an additional limitation to the contents of the present invention. The purpose of providing the embodiments is to understand the disclosure of the present invention more thoroughly and comprehensively. Moreover, the above technical features continue to be combined with each other to form various embodiments not listed above, all of which shall be regarded within the scope recorded in the description of the present invention. Further, for those ordinary skilled in the art, improvements or transformations can be made according to the above explanation. All of these improvements and transformations shall belong to the protection scope of claims of the present invention.

What is claimed is:

1. A double-sided display simultaneous translation device, comprising:
    a housing with a trapezoidal cross section,
    a first display and a second display oppositely arranged on the housing,
    a first camera and a second camera oppositely arranged on an upper side of each of the first display and the second display,
    a first microphone and a second microphone oppositely arranged on a lower side of each of the first display and the second display,
    a loudspeaker arranged in the housing,
    a base arranged below the two display screens for supporting the double-sided display simultaneous translation device,
    at least a processor, and
    a memory in communication with the at least a processor,
    wherein the first display and the second display are touch displays and an inner space is formed therebetween; the loudspeaker is arranged in the inner space; an indicator lamp, a volume button and a power button are arranged in alignment on a top surface of the housing; and a loudspeaker interface, an external acoustic interface and an external microphone interface are arranged on a side surface of the housing;
    wherein the memory is configured to store computer executable instructions; and the at least a processor is configured to execute the computer executable instructions to perform a translation method comprising:
    receiving a first voice input through a first microphone from a first user where a voice analog signal is converted into a digital signal;
    displaying text of the first voice input in a first language on a first display;
    translating the first voice input to a second language;
    displaying text of the translated first voice input in the second language on the second display and outputting the translated first voice input through a loudspeaker;
    receiving a second voice input through a second microphone from a second user where a voice analog signal is converted into a digital signal;
    displaying text of the second voice input in the second language on a second display;
    translating the second voice input to the first language; and
    displaying text of the translated second voice input in the first language on the first display and outputting the translated second voice input through the loudspeaker.

2. A non-transitory computer readable storage medium for the double-sided display simultaneous translation device of claim 1, wherein the non-transitory computer readable storage medium is configured to store the computer executable instructions for executing the translation method.

* * * * *